United States Patent [19]
Zimmet

[11] 3,778,151
[45] Dec. 11, 1973

[54] MICROFILM CAMERA WITH LONGITUDINAL AND CROSS SLIDES MOVABLE IN STEPS

[75] Inventor: Hans Zimmet, Dresden, Germany
[73] Assignee: VEB Pentacon Dresden Kamera-und Kinowerke, Dresden, Germany
[22] Filed: Oct. 2, 1972
[21] Appl. No.: 294,307

[52] U.S. Cl. .................. 355/53, 353/27, 355/54
[51] Int. Cl. ............................................. G03b 27/42
[58] Field of Search ................. 355/53, 54; 353/27

[56] References Cited
UNITED STATES PATENTS
| | | | |
|---|---|---|---|
| 3,502,411 | 3/1970 | Wells | 355/54 |
| 3,618,497 | 11/1971 | Ataka | 355/53 |
| 3,680,461 | 8/1972 | Amesbury et al. | 355/53 |

Primary Examiner—Samuel S. Matthews
Assistant Examiner—Richard A. Wintercorn
Attorney—William A. Drucker

[57] ABSTRACT

A microfilm camera includes a housing, a longitudinal slide which can be moved in steps in said housing, and a cross slide which can also be moved in steps within the housing. A cross slide is provided within the housing for carrying one film sheet at a time. To the longitudinal slide and the cross slide there are attached transport bars having grooves which are cut transversely to the movement of the respective slide and which are engaged by pins mounted on plates drivable by electric motors. The pins are diametrically arranged on the pin plates and are spaced at a distance equal to the distance between the grooves in the transport bars. The pins also serve to actuate contacts for opening and closing the circuits of the respective electromotors.

4 Claims, 3 Drawing Figures

PATENTED DEC 11 1973

3,778,151

MICROFILM CAMERA WITH LONGITUDINAL AND CROSS SLIDES MOVABLE IN STEPS

BACKGROUND TO THE INVENTION

The invention relates to a microfilm camera with a longitudinal slide which can be moved by steps in the camera housing and a cross slide which is likewise movable by steps in the housing, the cross slide being designed for carrying one film sheet at a time.

There has already been described a multiplicator camera with which exposure can take place by lines or columns. The stepwise longitudinal and transversal movement is made possible by arranging a film magazine which can be horizontally displaced in a frame which can be vertically displaced. With this arrangement, a vertical movement, i.e. a change of line, only occurs when a detent tightened by a power store is released by means of a manual lever. A return movement is not possible. The horizontal movement along a gear rack is likewise carried out with this manual lever, a gear rack being provided for every line.

In another known camera design, one reversible electromotor each is provided for carrying out the longitudinal and transversal movements of the slides. The transmission of motion from the motor to the slides takes place via cogwheels and gear racks by means of multiple step-up and step-down gearing. Each step is terminated by switching off the drive motor, i.e. by stopping the first member of a comparatively long wheel chain. For this reason the precision of the step size is unsatisfactory.

The object of the invention is to improve the forward and return movements of the slides and to increase the precision of the step size.

The invention is based on the task of providing a device for arbitrary forward and return movements of the longitudinal and cross slides, which permits of identical step sizes between the individual pictures.

SUMMARY OF THE INVENTION

According to the invention this is achieved by fixing to the longitudinal as well as the cross slide transport bars with transport grooves which are cut transversally to the movement of the slide and are in gear with pin plates mounted in the camera housing, on the one hand, and in the longitudinal slide, on the other hand, the pin plates being driven by electromotors and each pin plate carrying two diametrically opposed transport pins arranged at a distance equal to the distance between the transport grooves, as well as trip cams which, in the dead centre situation between the transport pins and the transport grooves, open an operating switch for interrupting the operating circuit of the electromotor concerned. It is expedient for the trip cams of each pin plate to open in the dead centre situation between the transport pins and the transport grooves two operating switches simultaneously, one operating switch being electrically parallel to the starting switch for the rotation of the motor in one direction and the other operating switch being electrically parallel to the starting switch for the rotation of the motor in the opposite direction.

The pin plates are preferably so devised that the transport pins constitute the trip cams actuating the operating switches. According to another expedient version, the transport grooves are arranged perpendicularly to the direction of movement of the slides.

BRIEF DESCRIPTION OF THE DRAWINGS.

The invention is explained below with reference to an exemplified embodiment. In the associated drawing

Figure 1:
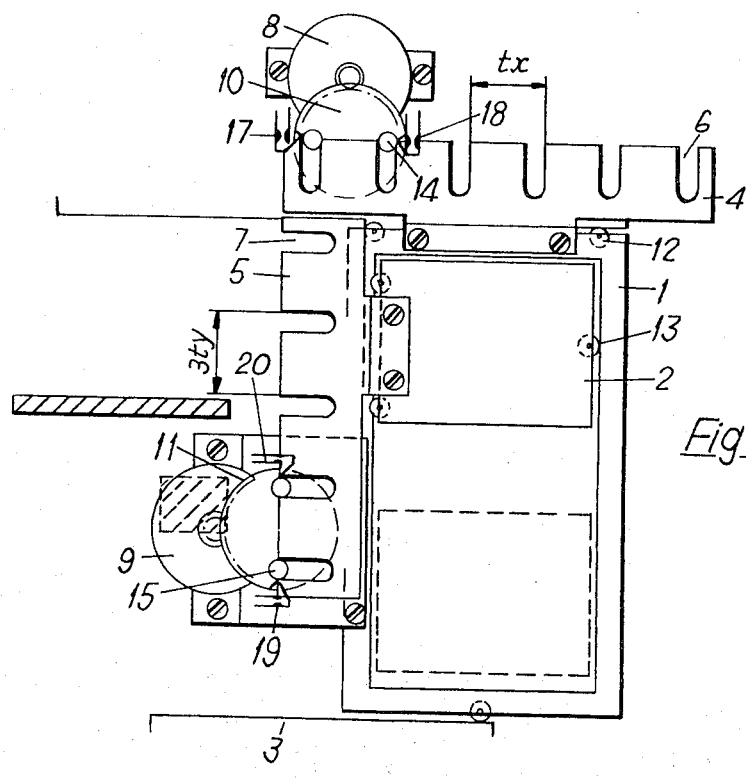
FIG. 1 shows a diagram of the structure of the cross slide gear.

PREFERRED EMBODIMENT OF THE INVENTION;

An electromotor 8 is installed in a camera housing which is not shown, and fixed to the housing. A pin plate 10 driven by the electromotor 8 is mounted in the housing. This pin plate 10 has two transport pins 14 which are diametrically opposed to each other. The distance between the transport pins 14 corresponds to the size of one step of the longitudinal slide 1. The longitudinal slide 1 is movably mounted on rolls 12 sliding on rails 3 which are fixed to the housing. A transport bar 4 provided with transport grooves 6 is firmly connected to the longitudinal slide 1. The transport grooves 6 are arranged in accordance with the distances between the transport pins 14.

Furthermore, an electromotor 9 is likewise firmly connected to the longitudinal slide. 1. A pin plate 11 driven by the electromotor 9 is mounted in the longitudinal slide 1. This pin plate 11 has two transport grooves 15 which are dia-metrically opposite. The distance between the transport pins 15 corresponds to the size of one step of the cross slide 2. The cross slide 2 which constitutes a support plate for one film sheet is mounted with rolls 13 on the longitudinal slide 1. A transport bar 5 provided with transport grooves 7 is firmly connected to the cross slide 2. The transport grooves 7 are arranged in accordance with the distances between the transport pins 15.

Figure 2:
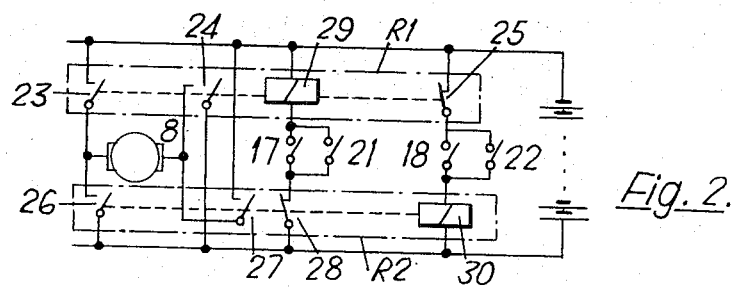
FIG. 2 shows the circuit diagram for the movement of the slides.
Figure 3:
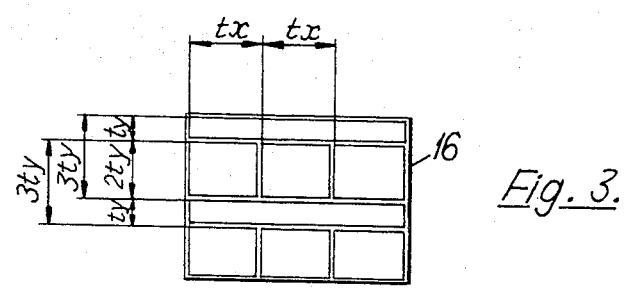
FIG. 3 shows a film sheet.

The operating switches 17, 18 are arranged parallel to the starting switches 21, 22 (see FIG. 2) and are actuated by the pins 14 of the pin plate 10. The relay contacts 28 and 25 as well as the electromagnets 29 and 30 are connected in series with the operating switches 17 and 18. The further relay contacts 23, 24 and 26, 27 are located in current branches situated in series with the electromotor 8. Because of the analogous design of the current diagrams for the movements of the longitudinal and the cross slides, the method of operation is explained only for the movement of the longitudinal slide 1:

In the shown position (see FIG. 1) the longitudinal slide 1 is at rest. The operating switches 17, 18 (see FIG. 2) are opened, as are the relay contacts 23, 24 and 26, 27. When the longitudinal slide 1 is to be moved by one step size to the left, the starting switch 21 is briefly actuated and the circuit for the relay $R_1$ is thus closed. The electromagnet 29 of the relay $R_1$ is excited and causes the relay contacts 23, 24 to close. On the other hand, the relay contact 25 is opened and prevents the relay $R_2$ controlling the right-hand movement of the longitudinal slide 1 from being excited.

The electromotor 8 sets the pin plate 10 in motion. Due to this movement, the transport pins 14 of the pin plate 10 allow the operating switches 17, 18 to be closed. During the movement of the motor, one of the transport pins 14 engages with one of the transport grooves 6. As a result, the transport bar 4 and the longitudinal slide 1 firmly connected thereto are moved until the transport pins 14 are again perpendicular to the transport grooves 6 and thus parallel to the movement of the slide. The transport pins 14 open the operating switches 17 and 18; the relay $R_1$ is no longer excited. Consequently, the relay contacts 23, 24 fall back, the electromotor is stopped and therefore also the movement of the slide. The step size is exactly observed because, due to the dead centre situation between the transport pins 14 and the transport grooves 6 a slight running on of the electromotor 8 is not transmitted to the movement of the slide. To initiate the right-hand movement of the longitudinal slide 1, the starting switch 22 is briefly actuated. The circuit for the relay $R_2$ is thus briefly closed. The electromagnet 30 of the relay $R_2$ is excited and causes the relay contacts 26, 27 to close. On the other hand, the relay contact 28, is opened and prevents the relay $R_2$ controlling the left-hand movement of the longitudinal slide 1 from being excited. The movement of the longitudinal slide 1 started in this way and the stopping of the latter takes place as described for the left-hand movement.

The movements of the cross slide 2 takes place via the electromotor 9 in an analogous way, the electromotor 9 being controlled by a circuit diagram which is identical with the circuit diagram for the longitudinal slide 1.

I claim:

1. In a microfilm camera having a housing, a longitudinal slide which can be moved stepwise within the housing, and a cross slide in said housing for carrying one sheet at a time, the provision of a. first and second transport bars attached respectively to said longitudinal and cross slides, said bars having formed therein elongated openings extending transversely to the movement of the respective slide,
b. first and second pin plates mounted in the housing,
c. first and second electromotors for driving said pin plates,
d. two diametrically opposed pins provided on each pin plate, said pins being spaced apart at a distance equal to the spacing of the elongated openings, and
e. switch contacts for opening and closing the circuit through the electromotors being operable by said pins.

2. A microfilm camera according to claim 1, wherein in the dead centre situation between the transport pins and the elongated slots, trip cams of each pin plate open two operating switch contacts simultaneously, a first operating switch pair being electrically parallel to a starting switch for the rotation of one electromotor in one direction, and the other operating switch being electrically parallel to the starting switch for the rotation of said one electromotor in the opposite direction.

3. A microfilm camera according to claim 2, wherein the transport pins serve as trip cams actuating the operating switch contacts.

4. A microfilm camera according to claim 1, wherein in that the transport grooves are arranged perpendicularly to the direction of movement of the slides.

* * * * *